Oct. 6, 1925.　　　　　　　　　　　　　　　　　1,556,515

H. E. FRENCH

COUPON

Filed Sept. 11, 1923

WITNESSES

INVENTOR
Henry E. French
BY
ATTORNEYS

Patented Oct. 6, 1925.

1,556,515

UNITED STATES PATENT OFFICE.

HENRY E. FRENCH, OF NEW YORK, N. Y.

COUPON.

Application filed September 11, 1923. Serial No. 662,121.

*To all whom it may concern:*

Be it known that I, HENRY E. FRENCH, a citizen of the United States, and a resident of the city of New York, borough of Manhattan, in the county and State of New York, have invented a new and Improved Coupon, of which the following is a full, clear, and exact description.

This invention relates to a coupon device, and has for an object the provision of a simple, efficient coupon device whereby any particular organization, such as an electric light company, can stimulate the attendance of the public on their own stores and at the same time direct attention of the public to other and co-operating merchants in any given locality.

Another object comprises means whereby the above-mentioned objects may be achieved and further attention may be called to advertising matter disposed on the coupons.

A further object concerns the provision of means whereby this device is so formed that more than one coupon can be torn therefrom.

The invention is illustrated in the drawings, of which—

Figure 1:
Figure 1 is a front elevation of the device.

In considering the desirability of stimulating the business of one or more organizations by means of a system of coupons, I developed the idea which is the subject matter of this application. In general, it requires that one company, such as an electric light company, send out with its monthly light bills these coupons or tokens in the form of portions folded together and separated only by perforating a line between them, whereby they can be torn apart. The outer surface of one portion of the coupon, when the device is folded together, represents or calls attention to the fact that this portion of the token is given in exchange for other coupons at certain stores owned by the electric light company. Immediately beneath the lower edge of the front token or fold, the lower edge of the rear fold will extend down a proper distance and have thereon a notice calling attention to advertising matter on the inner portions of the folded material. The back of the token also contains some advertising matter and the statement that this token can be exchanged at another store not necessarily connected to the first one but associated therewith in a sufficiently definite way that the customers of the first store will proceed to the second store at once in order to exchange the token for coupons, and this attendance will naturally and inevitably stimulate the business of the second store. Furthermore, the interior of the folded portion is provided with printed matter, such as advertising, which may be of any desired shape or design as required by the conditions of each problem.

As shown in the drawings, the coupon device comprises two folded portions 1 and 2 separated only by a line of perforations such as 3 along which they can be severed if desired. The portion 1 has printed on its front surface matter announcing the fact that this token can be exchanged for a certain number of regular trade coupons at the store or stores owned by the company. This will, of course stimulate the attendance of the holders of these tokens at the stores referred to, and the mere increase in attendance will tend indirectly to cause greater buying than before. The lower edge of the rear portion 2 of the device or folder extends considerably below the lower edge of the front portion or token and on this lower part of the rear portion 2 a notice $2^a$ is printed calling attention to the advertising matter disposed on the inner surfaces, such as 4 and 5, of the folded portions. This advertising can, of course, be advertisements of even other stores than those previously referred to, and this advertising will stimulate their trade to some extent.

Figure 2:
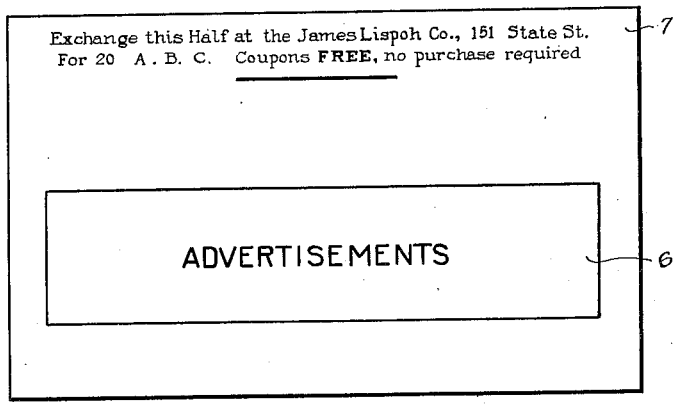
Fig. 2 is a rear elevation.
Figure 3:
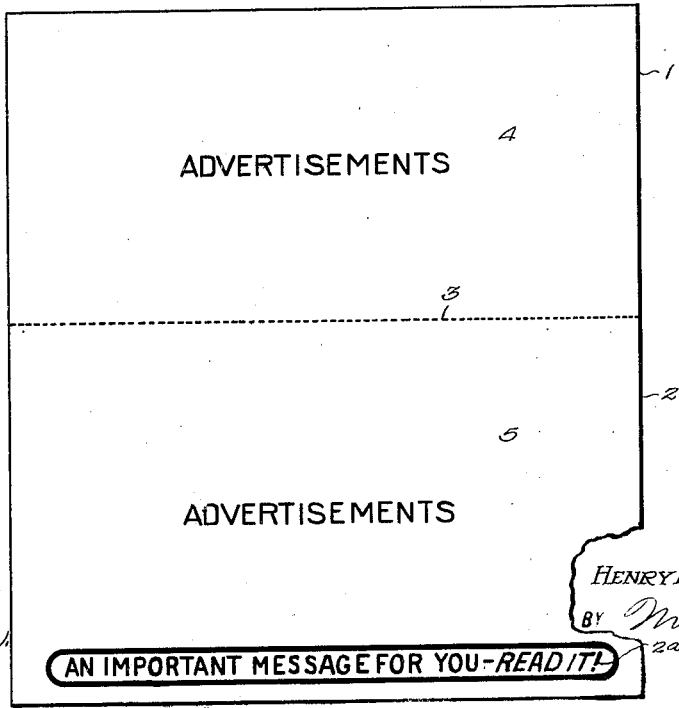
Fig. 3 is an elevation of the device with a portion of the coupon open and laid out flat.

It will be noted from Fig. 2 that the back surface of the portion of the token is provided with more advertising space 6, and also with a statement at the top 7 which directs the holder of the token to a second store where these tokens will be exchanged for free coupons. Of course, these coupons are to be used later on in buying articles from the parent company, the first one previously mentioned, but the mere necessity that the holders of these tokens should have to go into the second store in order to get the free coupons will naturally stimulate his own trade and, therefore, this device has provided a means whereby merchants and organizations which otherwise have very little in common in their business are assisted in aiding each other's business through the intermediary of this simple device.

In the operation of the device, it is the intention to place these folded tokens into the electric light bills of any particular company, and a person getting the bill will naturally read the token and perceive that he can present one-half at the electric light stores and get value for it there; and he will also perceive that he can present the other half of the token to a second store and there get a free coupon permitting him to buy some more goods at the first store.

What I claim is:—

1. A coupon which includes a pair of folded portions separated by a line of perforations, printed matter on the outer surface of one of said portions relating to the fact that this portion of the coupon has an exchange value at a certain store, and printed matter on the outer surface of the other of said portions relating to the fact that this portion has an exchange value at another store, the temporary union of the two portions thus permitting one company to assist in stimulating the trade of another by sending out these two coupons together to a customer.

2. A coupon which includes a pair of folded portions separated by a line of perforations and adapted to be folded together, the lower edge of one of said portions extending below the lower edge of the other, a printed notice disposed on the lower edge of the last-mentioned portion and calling attention to printed matter contained on the inner surface of each portion, printed matter disposed on the outer surface of one of said portions and relating to the fact that said portion has an exchange value at a certain store, and printed matter disposed on the outer surface of the other of said portions and relating to the fact that said portion has an exchange value at another store, whereby one company can assist in stimulating the trade of another by sending out these two portions together to its customers.

HENRY E. FRENCH.